July 10, 1934.  G. M. SKELLY  1,966,266
CAGE FOR ANTIFRICTION BEARINGS
Filed Aug. 6, 1931
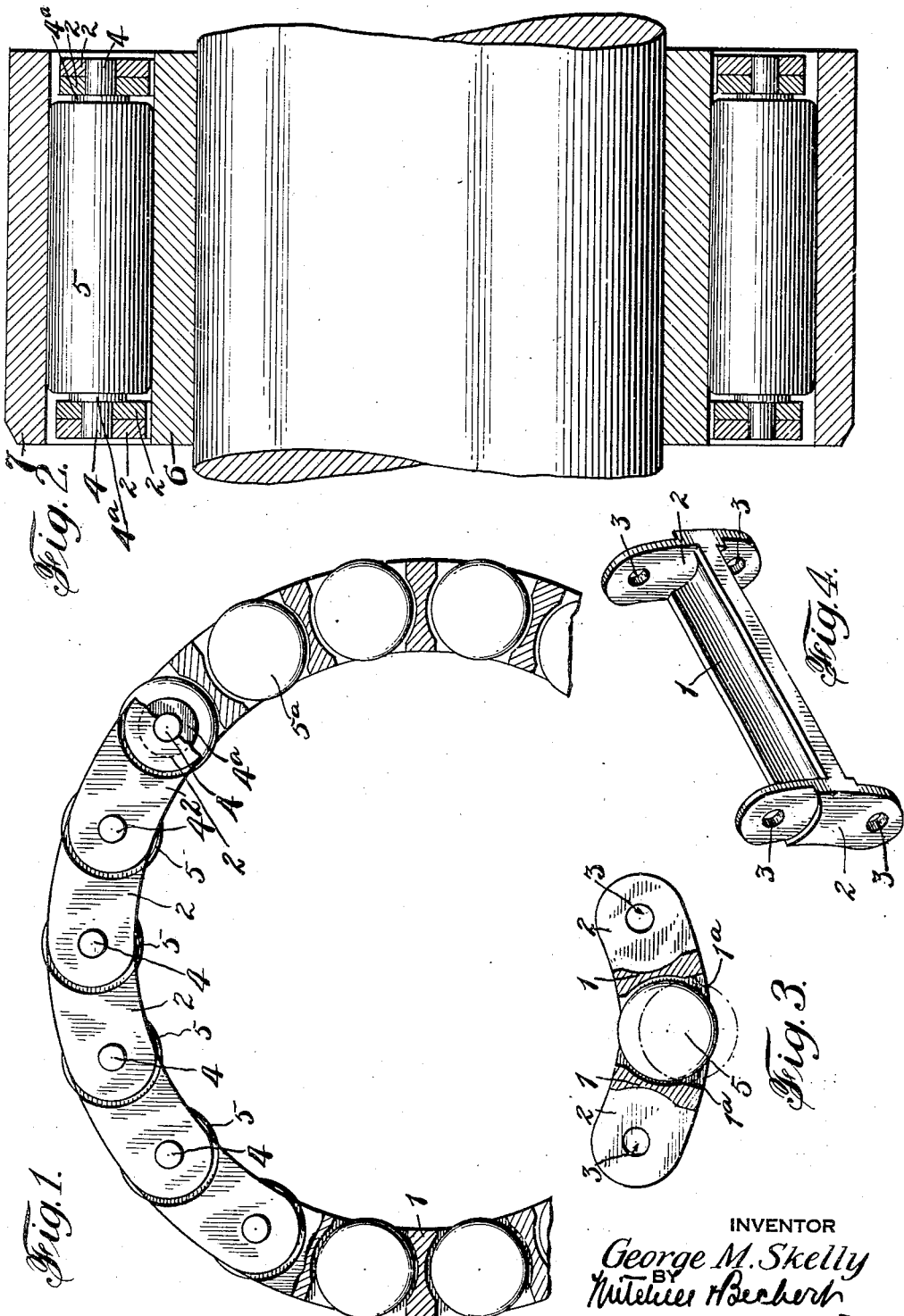
INVENTOR
George M. Skelly
BY
ATTORNEY Patented July 10, 1934

1,966,266

UNITED STATES PATENT OFFICE 1,966,266

CAGE FOR ANTIFRICTION BEARINGS

George M. Skelly, New Britain, Conn., assignor to The Fafnir Bearing Company, New Britain, Conn., a corporation of Connecticut Application August 6, 1931, Serial No. 555,408

10 Claims. (Cl. 308—217)

This invention relates to certain new and useful improvements in cages for anti-friction elements of anti-friction bearings, the object being to provide a novel construction whereby such cages may be easily assembled and filled with rotatable anti-friction devices, such as balls or rollers, all of which when assembled will be securely retained in operative position. The construction is such that said cage may be emptied and disassembled either in whole or in part with equal facility.

In the accompanying drawing—

Fig. 1 is a side elevation partly in section of my improved bearing cage with the lower portion broken away;

Fig. 2 is a cross-section through said cage showing the same in operative position with associated parts;

Fig. 3 is a detail view in section of parts of two links of the cage showing the same in non-operative position to admit of the insertion or removal of a rotatable anti-friction device;

Fig. 4 is a perspective view of one of the links of my improved cage.

By reference to the drawing, it will be seen that the cage is made up of a series of links pivotally connected together to form in effect a circle. Since in the preferred form all of these links correspond substantially, a detailed description of one will suffice. Referring to Fig. 4, wherein I have shown a link designed particularly for an anti-friction device of the roller type, 1 represents what I will call the spacer part, the same being channeled or recessed on opposite sides whereby two adjacent anti-friction devices may extend partially into said channels or recesses so as to be partially embraced thereby. At each end of the spacer part 1, I provide a link head 2 which may be secured thereto in any desired manner. At the opposite ends of each head 2, I provide pivot passages 3—3 to receive pivot studs 4. One end of each stud preferably has a flanged head $4a$. Each link head is so shaped at its ends as to overlap and underlap the link heads adjacent thereto, as plainly seen in the drawing. 5 represents a revoluble anti-friction device designed to be held between two adjacent spacer links by being partially embraced on opposite sides thereby as shown in Fig. 1. The cage when fully assembled comprises a series or chain of links, each link being pivotally connected at its ends to the links adjacent thereto. The pivotal connection may be an ordinary pivotal connection but it is preferably of the special type shown herein in which the body of the stud 4 serves as the pivot proper to connect the ends of two adjacent links while the head portions $4^a$ of the studs stand at the inside of said links and are thus held in position by the ends of the anti-friction devices (see Fig. 2) when the latter are in place. To insert or remove an anti-friction device, the two links adjacent thereto are buckled outwardly, as shown in Fig. 3, so as to separate the edges $1^a$—$1^a$ (Fig. 3) and provide a sufficient space between the inner edges of the adjacent spacer parts 1—1 to permit the anti-friction device to be passed into or out of the embrace of said spacers. It is obvious that an anti-friction means such as a ball or balls might be substituted in place of a roller, and, manifestly, in such an event, if only one ball were used between two adjacent links the length of the spacers 1 shown would be shortened and the adjacent faces of the spacers might be dished, if preferred, instead of channeled (as in Fig. 4) thereby to better hold a single anti-friction device of the ball type.

It will now be seen that the cage may be progressively built up by adding link to link until a cage of the desired size, containing the desired number of anti-friction devices, has been completed. The diameter of the anti-friction devices is, of course, such that the bearing surfaces will project above the adjacent surfaces of the cage so that they will properly bear upon the two relatively movable parts with which they are to function. In Fig. 2, the parts to be associated with the bearing devices 5 comprise an inner bearing ring 6 and an outer bearing ring 7. The shape of the tracks of these bearing rings is immaterial; that is to say, they may be shaped to ride on rollers or on balls as desired. If at any time it is desired to remove or replace an anti-friction device, the cage is removed from between the rings 6—7 and the two links at opposite sides of the device to be removed are buckled outwardly as shown in Fig. 3, whereupon the anti-friction device may be taken out and a new one substituted. If for any reason it should be desired to add, subtract, or replace one of the links, this may be done with the utmost facility in the preferred form of construction wherein the pivot studs 4 may be removed from the links after the anti-friction devices which back up said studs have been taken out.

From the foregoing, it is apparent that, in the preferred construction, if any parts of the cage or any of the anti-friction bearing devices need replacement, such replacement may be made very quickly and easily and without the necessity of employing any tools.

I claim:

1. A cage for revoluble anti-friction bearing devices including a link having a recessed spacer portion for partially embracing a revoluble anti-friction device on one side, a similar link pivoted to the first link to partially embrace said device on the opposite side, both links coacting in one position to retain said device between them and when in another position to release said device.

2. A cage for anti-friction bearing devices including, a link having a recessed spacer portion for partially embracing a revoluble anti-friction device, another link pivoted to the first link and having a spacer portion arranged to stand on the opposite side of said device when in one position to hold said device against escape from between said spacers and when arranged to stand in another position to release said device.

3. A cage for anti-friction bearing devices including, a link having a recessed spacer portion for partially embracing a revoluble anti-friction device, another link pivoted to the first link and having a spacer portion arranged to stand on the opposite side of said device when in one position to hold said device against escape from between said spacers and when arranged to stand in another position to release said device, and removable pivots for said links, said device when in operative position holding said pivots against removal.

4. A cage for revoluble anti-friction devices comprising a chain of links pivotally connected together in series, each link including a spacer element recessed on opposite sides, a plurality of revoluble anti-friction devices between said spacers and held by and between the same when the links of said cage are in operative position, and released therefrom when the links of said cage are in non-operative position.

5. A cage for revoluble anti-friction devices comprising a chain of links pivotally connected together in series, each link including a spacer element recessed on opposite sides, a plurality of revoluble anti-friction devices between said spacers and held by and between the same when the links of said cage are in operative position, and released therefrom when the links of said cage are in a non-operative position, the pivots for said links comprising headed studs with the headed portions of said studs facing the adjacent ends of the anti-friction devices whereby said studs are held in place when said parts are assembled.

6. A cage for revoluble anti-friction devices comprising a series of pivotally connected links with spacers between the same for receiving anti-friction elements, pivot studs for said links, said devices backing up said studs to hold them in operative position.

7. A cage for revoluble anti-friction devices comprising a plurality of separate interconnected links forming a flexible body having pockets therein for anti-friction devices, said devices being insertible into and removable from said pockets when said body is flexed in one direction and being held in said pockets when said body assumes its normal operative position.

8. In a cage for anti-friction bearing devices, a flexible body comprising a plurality of separate interconnected elements forming between them pockets for receiving a plurality of anti-friction bearing devices, the walls of said elements holding said devices loosely within the cage when said elements are in normal operative position, and releasing said elements to permit the same to be removed when said interconnected elements have been buckled sufficiently out of their normal operative position.

9. A flexible cage for a plurality of roller bearings comprising a plurality of hinged parts forming between them a plurality of roller holding pockets, said pockets being opened sufficiently to permit rollers to be inserted therein and removed therefrom by buckling said parts sufficiently out of their normal roller holding position.

10. In a device of the character indicated, a flexible bearing cage comprising a plurality of separate interconnected parts having means for positioning and holding between them anti-friction bearing elements when said parts are in operative position, and releasing said bearing elements when said parts are in inoperative position.

GEORGE M. SKELLY.